United States Patent [19]
Hayes et al.

[11] Patent Number: 5,844,675
[45] Date of Patent: Dec. 1, 1998

[54] INTERCHANGEABLE SAMPLE STAGE WITH INTEGRAL REFERENCE SURFACE FOR MAGNETIC-HEAD SUSPENSION MEASURING INSTRUMENT

[75] Inventors: John B. Hayes; Eric M. Frey, both of Tucson, Ariz.

[73] Assignee: Wyko Corporation, Tucson, Ariz.

[21] Appl. No.: 866,747

[22] Filed: May 30, 1997

Related U.S. Application Data

[63] Continuation-in-part of Ser. No. 368,547, Jan. 4, 1995, Pat. No. 5,636,013.

[51] Int. Cl.$^6$ .............................. G01B 11/26; G11B 5/56
[52] U.S. Cl. ...................... 356/139.03; 360/104; 360/109
[58] Field of Search .................................. 360/109, 104; 356/139.03

[56] References Cited

U.S. PATENT DOCUMENTS

| | | | |
|---|---|---|---|
| 5,282,190 | 1/1994 | Maruo et al. | 360/109 |
| 5,381,289 | 1/1995 | Fiedler | 360/109 |
| 5,675,463 | 10/1997 | Li | 360/109 |
| 5,712,463 | 1/1998 | Singh et al. | 360/109 |

*Primary Examiner*—Stephen C. Buczinski
*Attorney, Agent, or Firm*—Antonio R. Durando

[57] ABSTRACT

An interchangeable clamp plate is designed to receive and hold a magnetic-head suspension in a predetermined position in a test clamp of a pitch and roll measuring instrument. The clamp plate comprises a support plate for securing the swage mount of the suspension to a predetermined reference plane and a reference surface integrally formed coplanarly with the support plate in a position within the normal operating range of the optics of the instrument. Each kind of suspension being tested is mounted on a clamp plate conforming to its specific geometry that is adapted for installation in the test instrument prior to measurement. As a result of this configuration, once the instrument is calibrated with respect to the reference surface coplanar with the swage mounting surface, measurement accuracy is inherently maintained during testing. Upon switching to a different kind of suspension, a new clamp plate with a similar integral and coplanar reference surface is installed in the instrument's clamp and used to recalibrate it before test measurements are performed on the new suspension.

16 Claims, 9 Drawing Sheets

INTERCHANGEABLE SAMPLE STAGE WITH INTEGRAL REFERENCE SURFACE FOR MAGNETIC-HEAD SUSPENSION MEASURING INSTRUMENT

RELATED APPLICATIONS

This is a continuation-in-part application of U.S. Ser. No. 08/368,547, filed on Jan. 4, 1995, currently pending and due to issue on Jun. 3, 1997, as U.S. Pat. No. 5,636,013.

BACKGROUND OF THE INVENTION

1. Field of the Invention

This invention is related in general to apparatus for measuring the torsional characteristics of magnetic-head suspension assemblies. In particular, the invention consists of a novel interchangeable plate for holding a suspension in a test clamp in close proximity to an integral reference surface aligned with the suspension.

2. Description of the Related Art

The magnetic head slider of a magnetic disk system operates by floating in very close proximity over the surface of the magnetic disk, thereby accurately reading and writing data thereon. While the magnetic head slider is floating disposed substantially in parallel over the disk during operation, it must be able to adjust its attitude to conform to magnetic-disk surface imperfections and dynamic displacements, such as surface vibrations generated by the rotating movement. Therefore, the torsional characteristics of the suspension supporting the slider are critical to the proper functioning of the apparatus and must be maintained within prescribed design specifications to prevent contact with the disk surface and avoid the disabling consequences that normally result therefrom.

For illustration, FIG. 1 shows in perspective view a conventional magnetic head gimbal assembly 2 (HGA) positioned over a magnetic disk 4. The head gimbal assembly 2 consists of a slider 6 mounted on a gimbal 8 which is either integral with or rigidly connected to a load beam 10 that comprises a pre-load region 12 and formed rails 22 that provide rigidity to the assembly. The combined gimbal and load beam, which constitute the suspension 11, support the slider portion of the head gimbal assembly. The suspension is in turn attached to a driving mechanism (not shown) by means of a screw or swage mount 14. In operation, the head gimbal assembly 2 is moved by the driving mechanism along the radius of the magnetic disk 4 (arrows A1) so that the slider 6 may be placed rapidly over the appropriate read/write tracks in circumferential direction with respect thereto as the disk is rotated in the direction of arrow A2.

For ease of description, the radial, tangential and vertical directions with respect to the surface of disk 4 are referenced in the figures by x, y and z coordinates, respectively. Thus, the magnetic head slider 6 is supported by the gimbal 8 for controlling pitching and rolling movements as the slider's position changes in the radial (x axis) and circumferential (y axis) directions of the magnetic disk 4. When the magnetic disk is rotated, an air spring is created by the air flowing between the surface of the disk and the rails 16 in the magnetic head slider 6, and the torsional characteristics (roll) of the suspension 11 and gimbal 8 must be such that the slider maintains its dynamic attitude through surface imperfections and vibrations of the rotating disk.

Each suspension consists of a metal portion that is formed from a very thin (in the order of 0.05 mm) metal sheet of homogeneous physical structure, thereby producing suspensions and load beams expected to have uniform torsional characteristics. The suspensions are strategically punched or etched to produce desired dynamic responses to forces that cause flexure, and the rigid structural rails 22 are typically formed in the suspension to provide support according to predetermined design criteria. The pre-load region 12 and the gimbal 8 in the suspension are normally bent with respect to the plane of the swage mount 14 to provide a built-in angle toward the disk surface before engagement with the disk 4 (a 13-degree angle is typical). When in use, the suspension is typically displaced to a condition approaching zero-degree deflection. This deflection creates a force against the slider 6 of the assembly that keeps the slider at the desired nominal flying height during operation (see FIG. 1).

As magnetic recording technologies evolve, progressive miniaturization of head gimbal assembly components creates critical challenges. One is the tolerance control on the static attitude parameters of the suspension 11 and gimbal 8 as the slider size is reduced. As the slider 6 becomes smaller, the narrower width between its rails results in smaller differential pressure profiles that produce head gimbal assemblies having flying roll characteristics closely correlated to their static roll attributes. Accordingly, flying attitude characteristics may be predicted well by testing the static attitude of the suspensions under controlled conditions.

Thus, in order to ensure the desired dynamic performance of the suspension (pitch, roll and resonance characteristics), each component of the assembly is manufactured according to specific design specifications and is bench tested for predetermined static parameters. The static attitude of each suspension is measured and compared to allowable tolerances. Copending application Ser. No. 08/368,547 describes an instrument for making such static roll and pitch measurements of a suspension that has been mounted on a supporting base to simulate its flying attitude while operating on a magnetic disk. As illustrated in FIG. 2 in a schematic drawing of such an instrument 100, the suspension 11 is firmly coupled to the support base 24 through the swage mount 14 and is clamped in a static attitude corresponding to the expected dynamic position in operation. The pitch and roll of a measurement point 26 on the suspension 11 (typically on the gimbal 8) with respect to the support base 24 are then measured by means of a collimated light source 28 and a point-range light source 30 having coincidentally directed beams 32,34. Each light beam is reflected from the measurement point 26 to a corresponding sensor array (such as array 36, receiving the light 38 from the point-range source 30), so that z-height measurements can be obtained by triangulation to determine the roll and pitch characteristics of the gimbal 8. In essence, as clearly understood by those skilled in the art, each measurement consists of determining the exact z position of the measurement point 26 with respect to the support base 24 on which the suspension 11 is mounted. A computer 40 electrically coupled to the autocollimation system and point-range sensor system can be used to perform the necessary calculations in known manner.

Inasmuch as the support base 24 of the instrument in FIG. 2 is also the reference plane with respect to which each measurement is made, its exact position must be known in order to be able to precisely calculate the pitch and roll characteristics of the suspension. That is, the instrument must be calibrated with respect to a reference surface that is either coincident with or coplanar with the surface of the support base 24. This requires a separate set of measurements to calibrate the instrument with respect to the support base 24 before actual measurements can be performed on the suspension samples. Because the support base 24 is obstructed by the swage mount 14 during testing of the suspension, the support base (i.e., the reference surface) is not normally accessible for calibration measurements; therefore, the instrument must be calibrated before mounting of the suspension and the calibration is then assumed to remain valid during actual measurements. In fact, given the extremely small distances being measured, the process of mounting a suspension on the support base is likely to introduce a relative displacement between the base 24 and the light sources 28,30, thereby introducing an offset that biases the test measurements. It is noted that the support base 24 must be removable from the instrument in order to allow its replacement with comparable support bases designed to receive different kinds of suspensions being measured. Accordingly, the opportunity for introducing a misalignment between the reference surface and the light sources is great during operation of the instrument, particularly as a result of vibrations and/or when the support base 24 is replaced between test runs to accommodate a different kind of suspension. In addition, because of the distance (in the order of several millimeters) that necessarily separates the support base (which receives the swage mount of the suspension) from the measurement point (which is typically on the gimbal), the same optics and light sources cannot be used in the manner described in the referenced application for the dual purpose of calibrating the instrument with respect to the support base and testing the suspension. Rather, either the light sources and the corresponding test-beam targets are movable between the gimbal 8 and the support base 24, or separate systems are used for each task. These drawbacks affect the reliability of the apparatus and increase its cost. Therefore, there still exists a need for an improved method and device for calibrating a magnetic-head suspension measuring instrument.

BRIEF SUMMARY OF THE INVENTION

One primary objective of this invention is a mechanism that allows the direct calibration of the test instrument prior to making measurements on a given sample suspension even after the suspension is clamped in place for testing.

Another goal of the invention is a mechanism that eliminates the possibility of offsets between the measured and actual positions of the reference surface as a result of vibrations and/or alignment errors during replacement of the suspension and/or its support base.

Still another goal is a mechanism that eliminates the need for separate or displaceable optics for calibration of the instrument between measurements.

Another objective is a mechanism that is suitable for incorporation in conventional testing equipment.

Finally, an objective of this invention is a device that can be manufactured in an economical and commercially viable manner utilizing components that are either already available or can be constructed at reasonable cost.

Therefore, according to these and other objectives, the present invention consists of an interchangeable clamp plate adapted to receive and hold a magnetic-head suspension in a predetermined position in a test clamp. The clamp plate comprises a support plate for securing the swage mount of the suspension to a predetermined reference plane and a reference surface integrally formed coplanarly with the support plate in a position within the normal operating range of the optics of the instrument. Each kind of suspension being tested is mounted on a clamp plate conforming to its specific geometry that is adapted for installation in the test instrument prior to measurement. As a result of this configuration, once the instrument is calibrated with respect to the reference surface coplanar with the swage mounting surface, measurement accuracy is inherently maintained during testing. Upon switching to a different kind of suspension, a new clamp plate with a similar integral and coplanar reference surface is installed in the instrument's clamp and used to recalibrate it before test measurements are performed on the new suspension.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENT OF THE INVENTION

The principal inventive aspect of this disclosure lies in the idea of providing a visible reference surface on the clamp plate of a magnetic-head suspension test instrument disposed on the same plane with the support surface with respect to which the suspension's roll and pitch measurements are to be made. Thus, such reference surface is available for calibration of the instrument even when the support surface is inaccessible because covered by the swage mount of the suspension placed on it. In addition, by forming the support and reference surfaces out of an integral rigid structure, perfect alignment between them is retained in spite of environmental perturbations, such as vibrations and/or temperature gradients.

Figure 1:
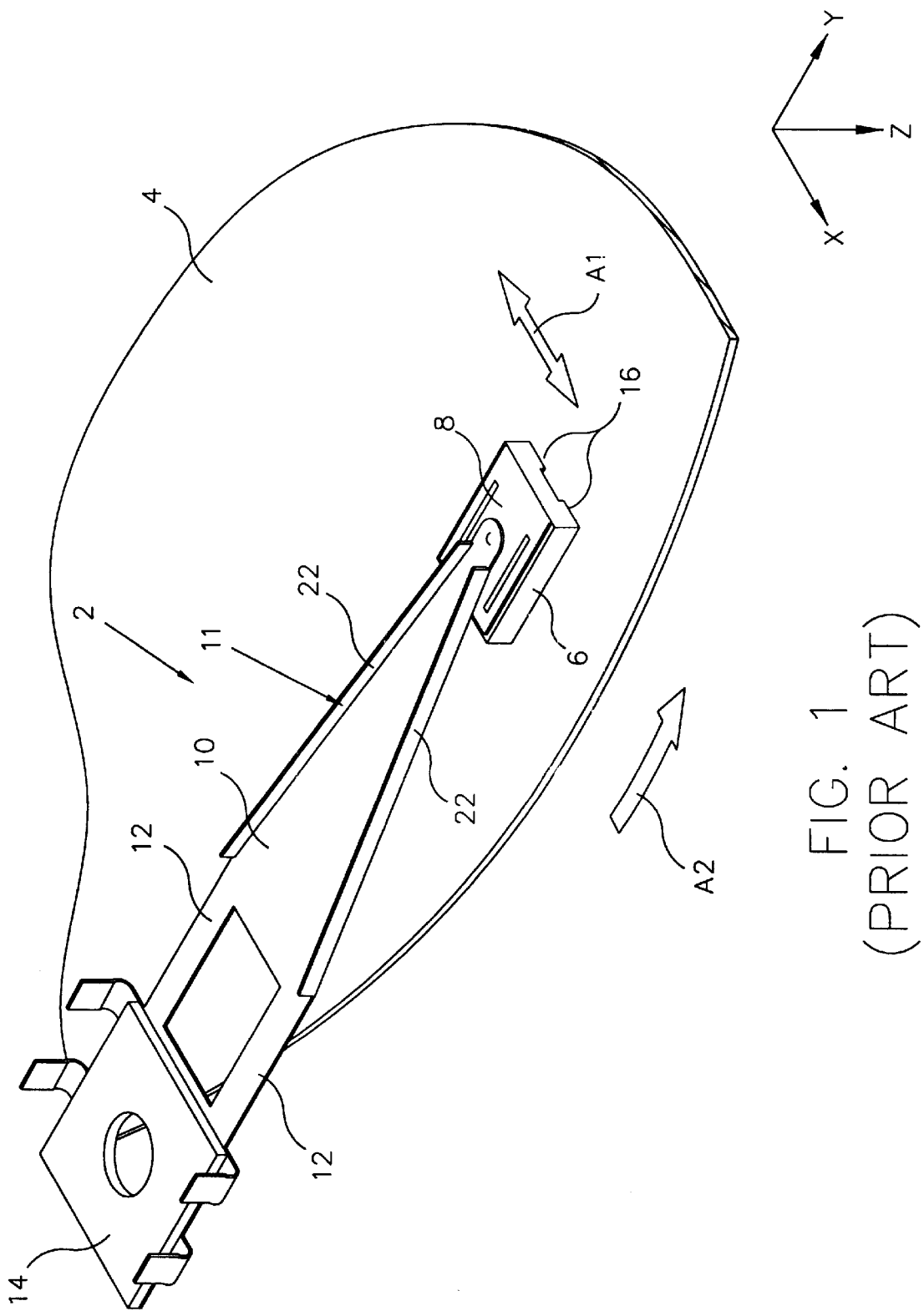
FIG. 1 is a simplified schematic representation of a conventional head gimbal assembly operating on a magnetic disk.
Figure 2:
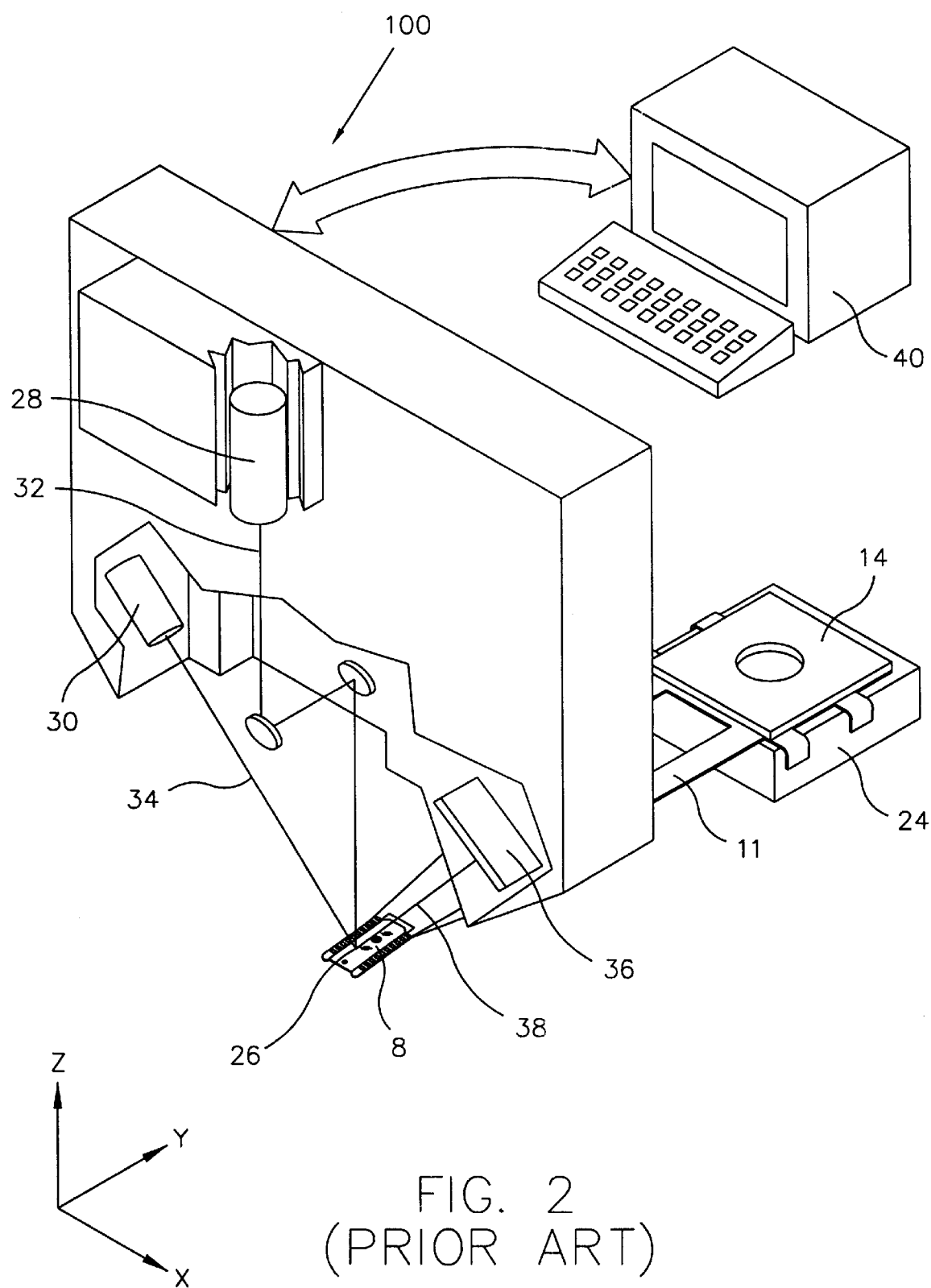
FIG. 2 is a schematic representation of an instrument for making static roll and pitch measurements of a suspension mounted on a supporting base to simulate its flying attitude while operating on a magnetic disk.
Figure 3:
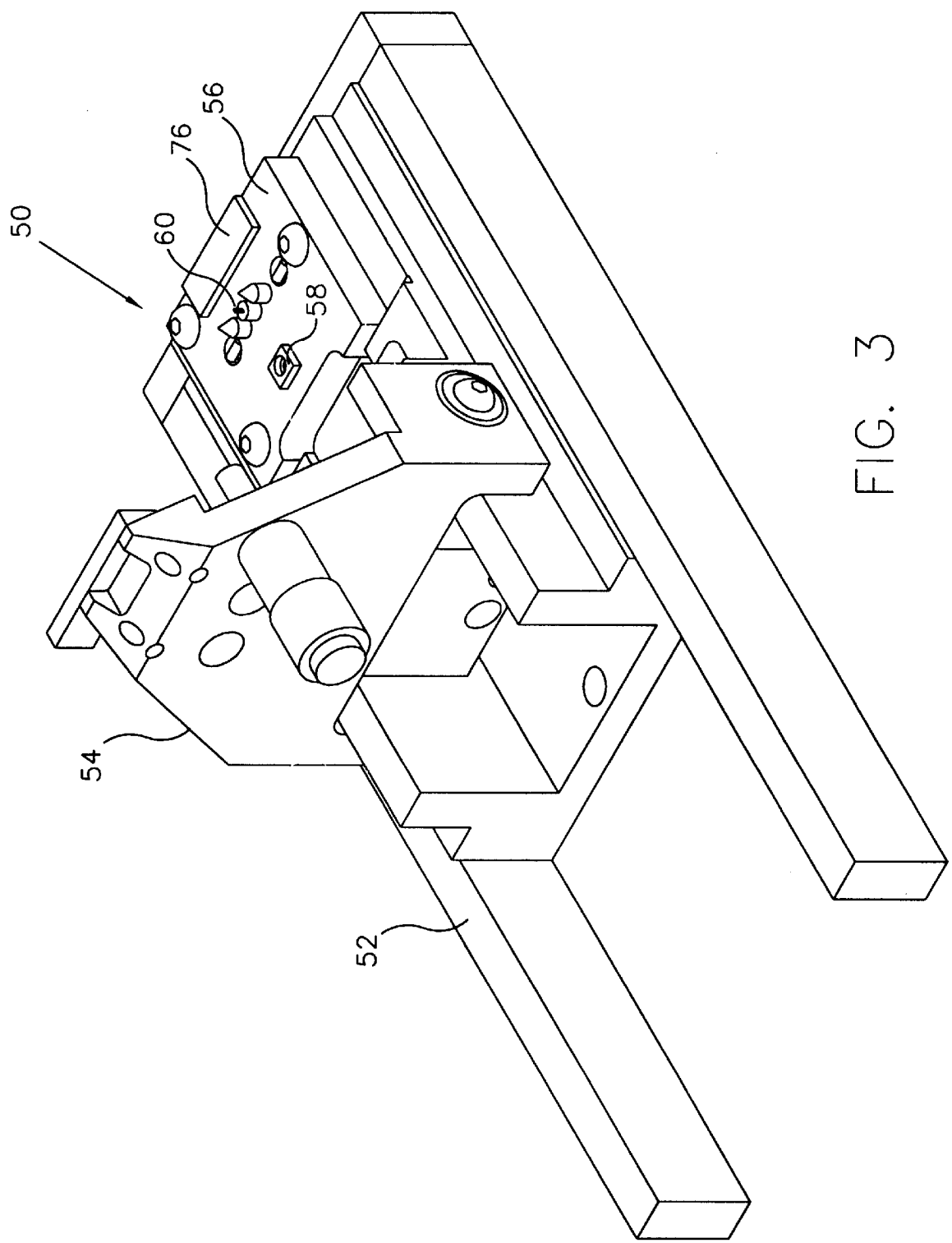
FIG. 3 is a schematic perspective illustration of a test clamp comprising a clamp plate according to the invention for receiving and holding a magnetic-head suspension in a predetermined position for testing.
Figure 4:
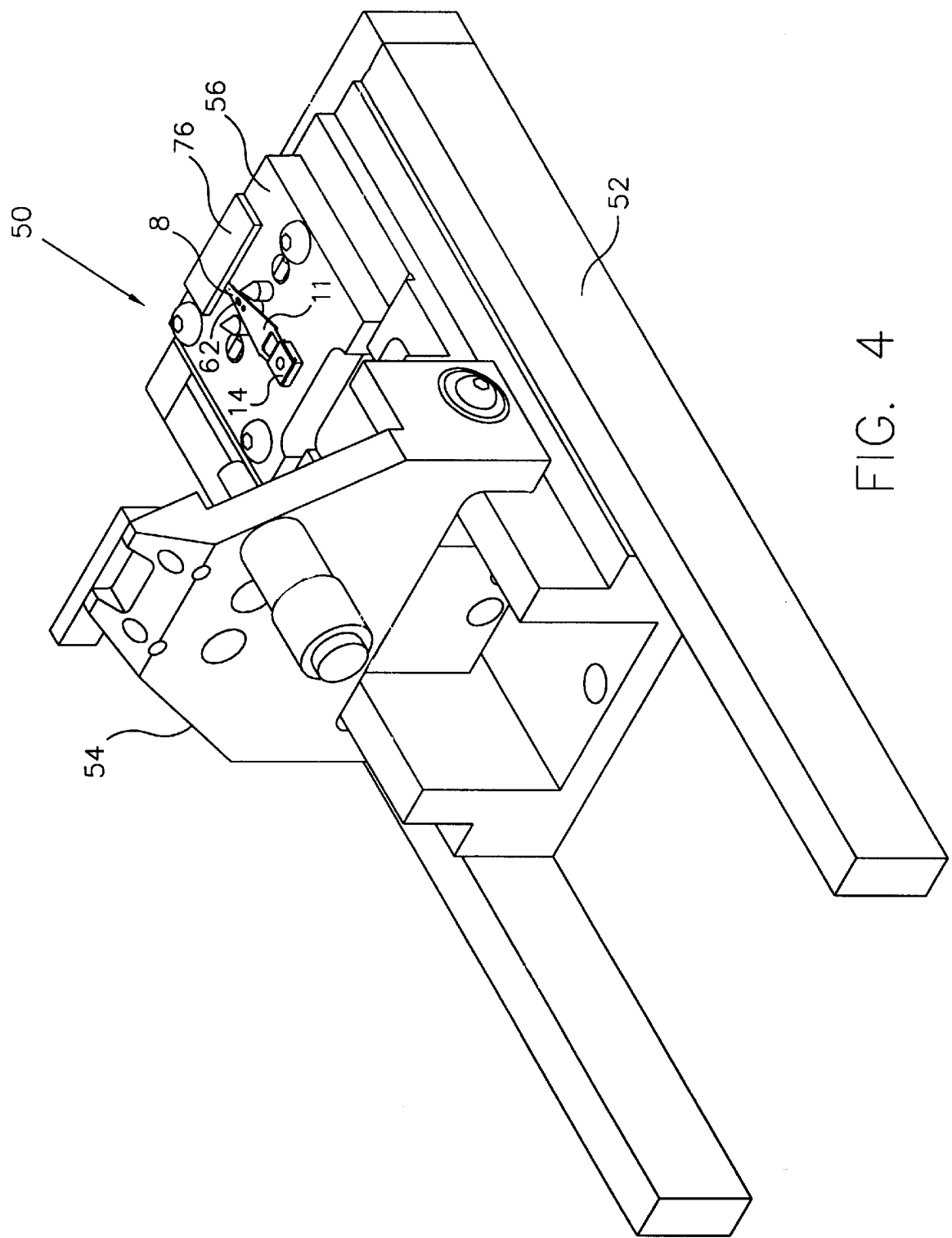
FIG. 4 is an illustration of a magnetic-head suspension positioned on the clamp plate of the test clamp of FIG. 3.

Referring to the drawings, wherein like parts are designated throughout with like numerals and symbols, FIG. 3 illustrates in schematic perspective view a test clamp for a magnetic-head suspension measuring instrument comprising a clamp assembly 50 according to the invention for receiving and holding a magnetic-head suspension in a predetermined position during testing. The clamp assembly 50 comprises a stationary base 52 and a hinged jaw 54 adapted to close over a clamp plate 56 firmly mounted on the stationary base 52. As shown in FIG. 4 and explained in more detail below, when closed, the jaw 54 secures a magnetic-head suspension 11 to be tested to the clamp plate 56. The clamp assembly 50 is then mounted on a test instrument, such as the one illustrated in FIG. 2, in alignment with the coincidentally directed beams 32,34 for measuring the roll and pitch characteristics of the suspension 11.

The clamp plate 56 consists of a support surface 58 aligned with a spring-loaded upward-urging locator pin 60 for precisely receiving and holding in place a magnetic-head suspension 11. As well known in the art for the purpose of testing these kinds of suspensions, the swage mount 14 of the suspension 11 is installed on the support surface 58 of the clamp plate 56 and the pin 60 is passed through a corresponding locator hole 62 in the suspension that is aligned with the support surface in a desired predetermined direction. Thus, the tip of the suspension 11 is urged upward by the locator pin 60. The jaw 54 is then closed over the clamp plate 56 to clamp the suspension 11 in place and bend it downward to form a predetermined angle with the support surface 58. Once so clamped, the suspension 11 is in position for pitch and roll measurements by targeting points on the gimbal 8 with the autocollimation and point-range sensor systems described in Ser. No. 08/368,547, or with equivalent testing apparatus.

Figure 5:
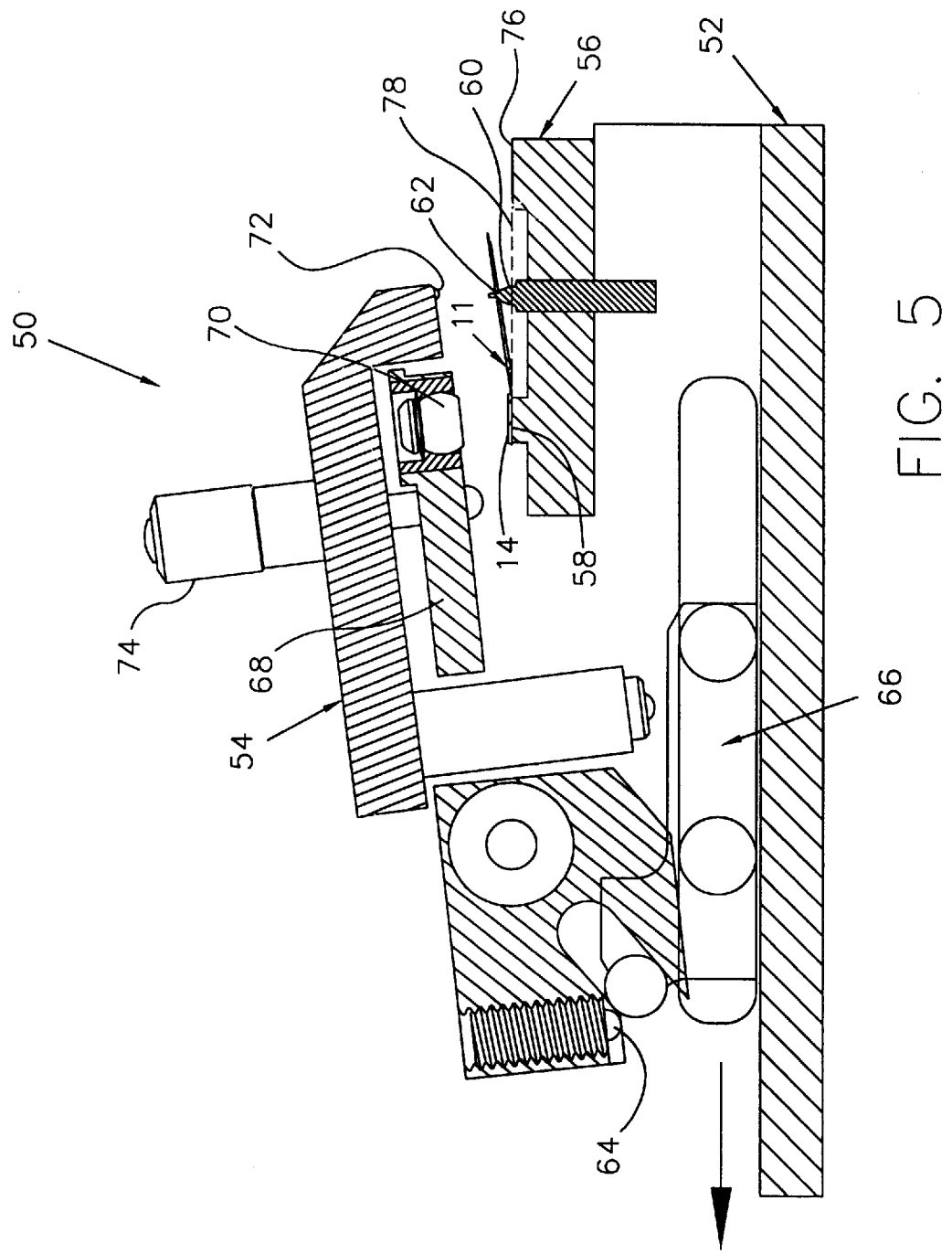
FIG. 5 is a schematic cross-section of the clamp assembly of FIG. 3 in open position illustrating the placement of a suspension on the clamp plate of the invention for testing in a magnetic-head suspension measuring device.
Figure 6:
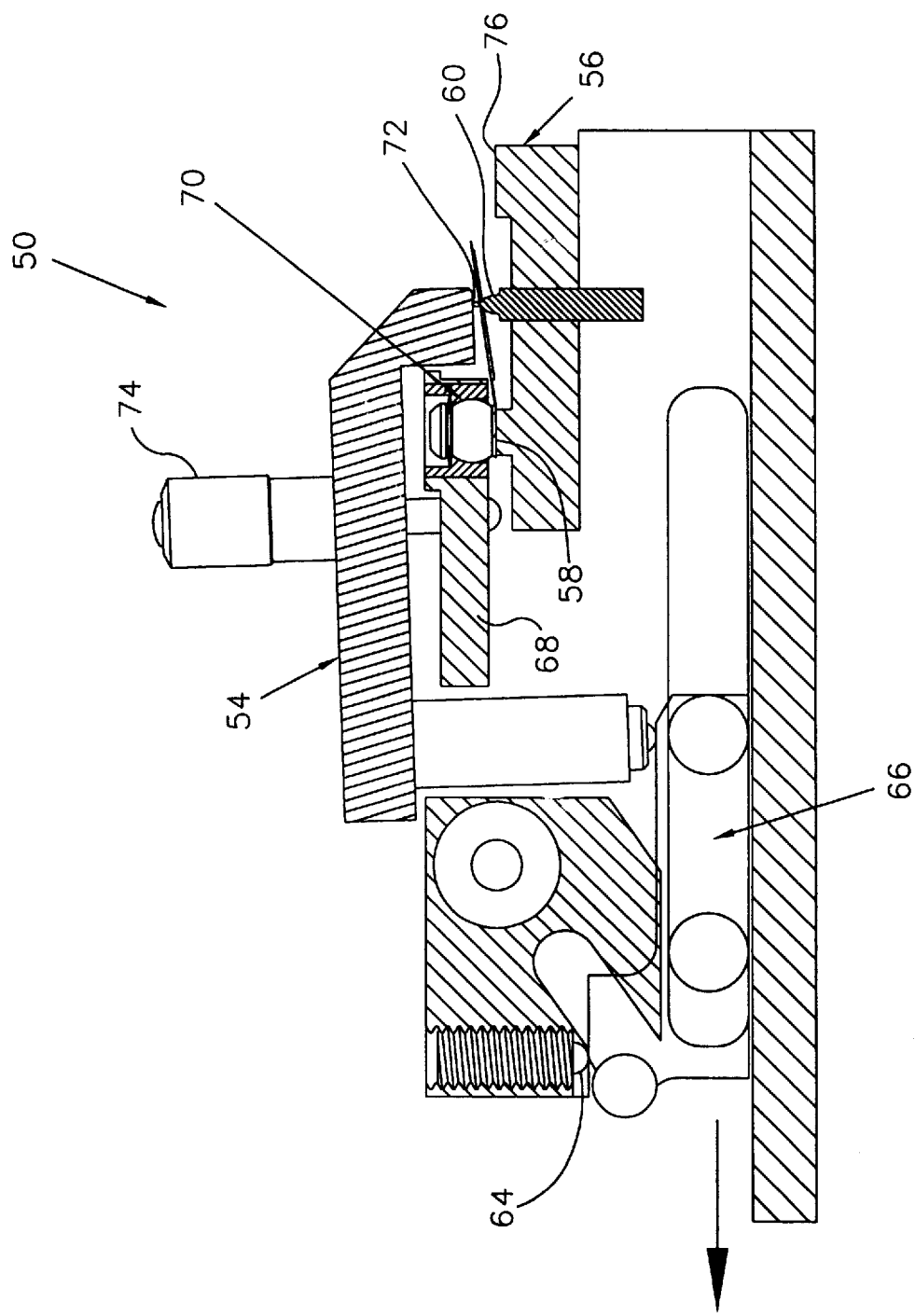
FIG. 6 is a schematic cross-section of the clamp assembly of FIG. 5 in partially closed position illustrating the clamping of the suspension to the support surface of the clamp plate of the invention.
Figure 7:
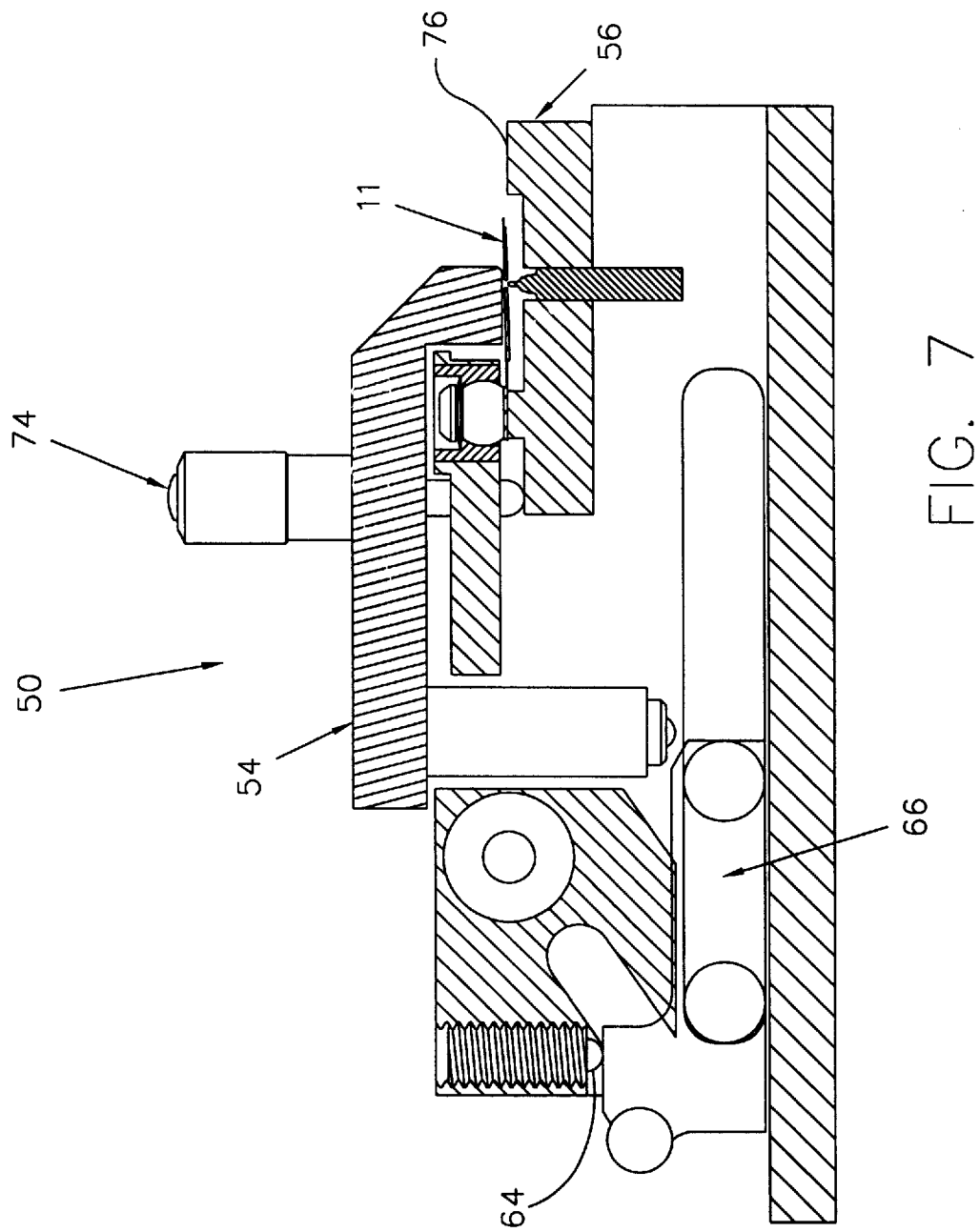
FIG. 7 is a schematic cross-section of the clamp assembly of FIG. 5 in fully closed position illustrating the clamping and bending of the suspension to form a predetermined angle with the support plate and reference surface of the clamp plate.

FIGS. 5–7 are simplified schematic cross-sections of the clamp assembly 50 during different stages of closure to illustrate the workings of the various parts to clamp the suspension 11 in place in preparation for testing. It is noted that these parts, while illustrated here for clarity of presentation, are well known in the art and do not constitute the inventive features of this disclosure. The clamping action of the jaw 54 is provided by an adjustable spring plunger 64 which, in cooperative engagement with a cam system 66, urges the jaw into a closed position, thereby causing the suspension 11 to be clamped in place at a predetermined angle with respect to the support surface 58. The jaw 54 comprises an inner member 68 with a swivel clamp 70 for pressing the swage mount 14 of the suspension against the support surface 58 when the jaw is in partially closed position. The inner member 68 is resiliently mounted on the jaw 54, so that the swivel clamp 70 engages the suspension 11 before the jaw is fully closed (see FIG. 6). A suspension elevation point 72 on the underside of the tip of the jaw 54 is provided to set the elevation of the distal end of the suspension 11 as desired for testing when the jaw is fully closed (thus forming a desired angle with the support surface 58, as seen in FIG. 7). A micrometer 74 in the jaw 54 is provided to adjust the exact rest position of the elevation point 72.

The heart of this invention lies in the idea of providing an additional surface 76 (seen in FIGS. 3–8) on the clamp plate 56 coplanar with the support surface 58 to serve as the reference surface for the optics of the magnetic-head suspension measuring apparatus. By placing it outside the area covered by the jaw 54 while in closed position, the reference surface 76 remains visible and readily available for calibration of the optics of the instrument even after a suspension is mounted in the clamp assembly. In addition, because of the reference surface's proximity to the intended measurement point 26 on the suspension, a single set of optics can readily be adapted to perform the calibration function as well as pitch and roll measurements without a need to move the optics, which greatly enhances the reliability and repeatability of the measurements. It is noted that, as illustrated by the dotted line 78 in FIG. 5, the reference surface 76 and the support surface 58 are preferably disposed on the same plane, such that calibration with respect to the reference surface 76, which is accessible, is directly equivalent to calibration and measurement with respect to the support surface 58, which not accessible. As those skilled in the art would readily recognize, though, the two surfaces need not be coplanar so long as they are parallel to one another and the offset between them is known and accounted for in the calculations of the z-positions measured by the instrument.

Another aspect of the preferred embodiment of the invention is the integral structure (the clamp plate 56) comprising both the reference surface 76 and the support surface 58, so that the two surfaces are not movable with respect to one another. In addition, by judiciously selecting the rigid material (440C Stainless Steel being preferred) and the geometry of the structure constituting the clamp plate 56, distortions due to vibrations and/or physical stresses are minimized and warpage due to temperature gradients is eliminated. A final important aspect of the invention is the formation of the support and reference surfaces 58,76 in a removable clamp plate 56 that can be readily installed in the clamp assembly 50 and replaced as needed to fit the different geometry of various types of suspensions to be tested. As such, the clamp plate 56 provides unique advantages versatility, stability and reliability of measurement not seen in the apparatus of the prior art.

Figure 8:
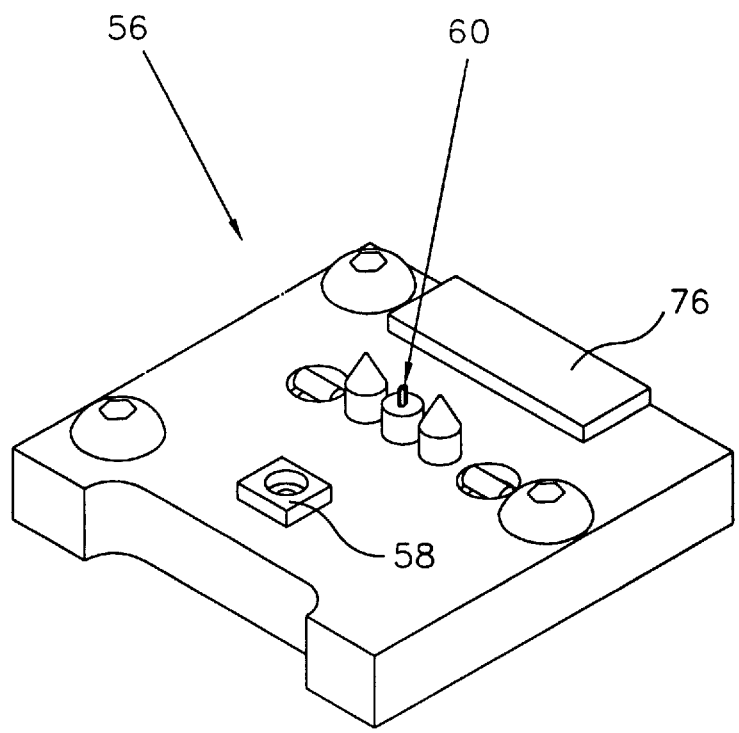
FIG. 8 is an enlarged perspective view of a clamp plate according to the invention.
Figure 9:
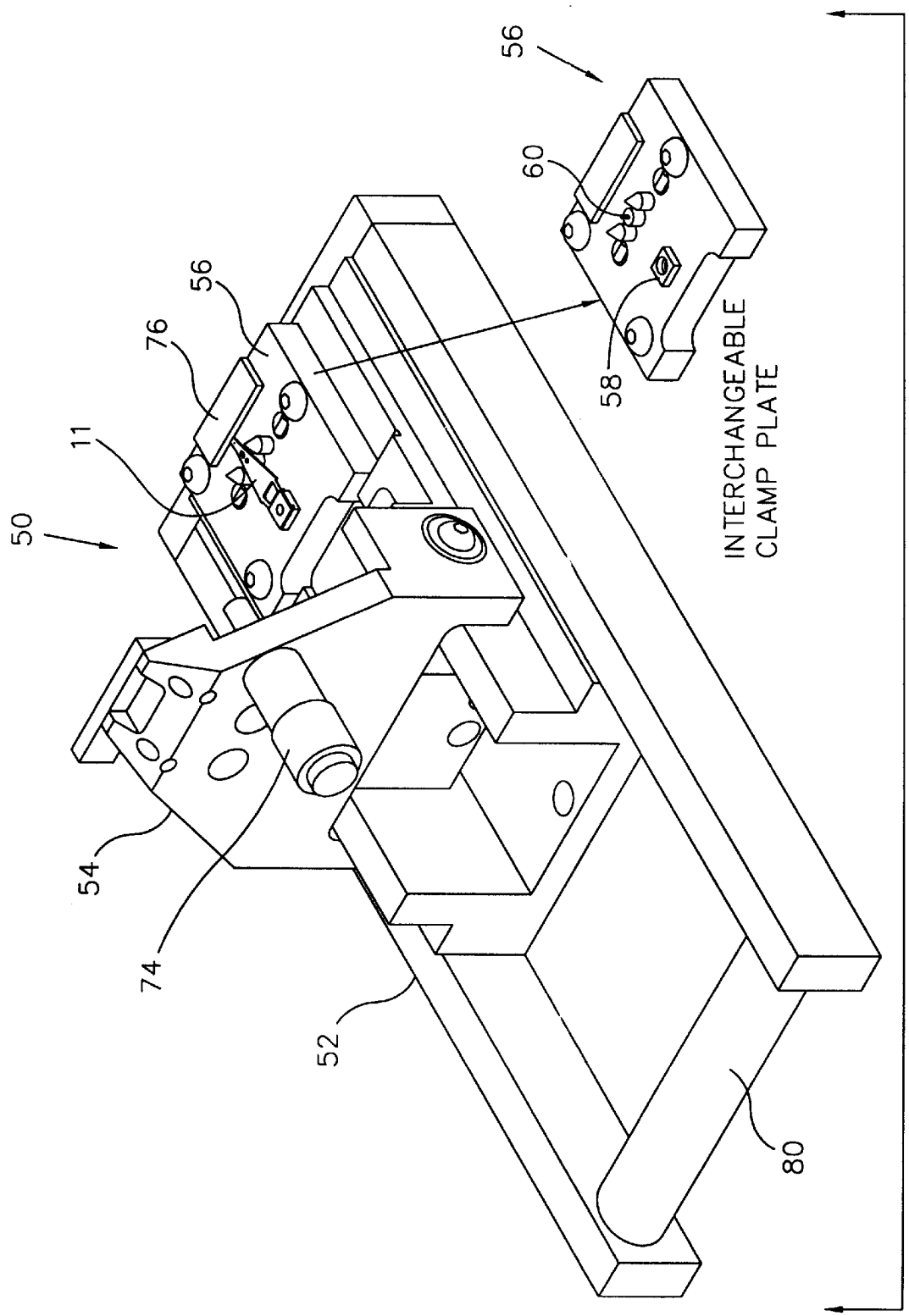
FIG. 9 is a perspective view of a test clamp according to the invention including the interchangeable clamp plate of FIG. 8 installed within it and a magnetic-head suspension mounted thereon.

FIG. 8 is a perspective illustration of an interchangeable clamp plate 56 having coplanar suspension-support and reference surfaces 58,76 according to the preferred embodiment of the invention. FIG. 9 illustrates the clamp plate 56 removably installed on the stationary base 52 of the clamp assembly 50, which in turn is adapted for mounting in a magnetic-head suspension measurement instrument of the type shown in FIG. 2. A handle 80 may be provided for convenience of loading and unloading the assembly 50 onto the instrument 100 or equivalent apparatus.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

We claim:

1. A clamp plate for receiving and holding in place a magnetic-head suspension in a predetermined position in a clamp assembly of an instrument for measuring pitch and roll characteristics of the suspension, said clamp plate comprising:

(a) a support surface for receiving said suspension mounted thereon;

(b) a locator pin for aligning said suspension in a predetermined direction; and (c) a reference surface disposed in parallel with said support surface.

2. The device recited in claim 1, wherein said clamp plate is removable from said clamp assembly.

3. The device recited in claim 1, wherein said clamp plate consists of an integral structure.

4. The device recited in claim 2, wherein said clamp plate consists of an integral structure.

5. The device recited in claim 1, wherein said support surface and said reference surface are coplanar.

6. The device recited in claim 2, wherein said support surface and said reference surface are coplanar.

7. The device recited in claim 3, wherein said support surface and said reference surface are coplanar.

8. The device recited in claim 4, wherein said support surface and said reference surface are coplanar.

9. A method for reducing calibration errors in an instrument for measuring pitch and roll characteristics of a magnetic-head suspension, wherein said suspension is received and held in place in a predetermined position in a clamp assembly of said instrument, said method comprising the following steps:

(a) providing a clamp plate in said clamp assembly, said clamp plate comprising a support surface for receiving said suspension mounted thereon, a locator pin for aligning said suspension in a predetermined direction, and a reference surface disposed in parallel with said support surface;

(b) calibrating said instrument with respect to said reference surface; and (c) measuring pitch and roll of said suspension with respect to said reference surface.

10. The method recited in claim 9, wherein said clamp plate is removable from said clamp assembly.

11. The method recited in claim 9, wherein said clamp plate consists of an integral structure.

12. The method recited in claim 10, wherein said clamp plate consists of an integral structure.

13. The method recited in claim 9, wherein said support surface and said reference surface are coplanar.

14. The method recited in claim 10, wherein said support surface and said reference surface are coplanar.

15. The method recited in claim 11, wherein said support surface and said reference surface are coplanar.

16. The method recited in claim 12, wherein said support surface and said reference surface are coplanar.

* * * * *